US010684136B2

(12) United States Patent
Baldauf et al.

(10) Patent No.: US 10,684,136 B2
(45) Date of Patent: Jun. 16, 2020

(54) USER-FRIENDLY NAVIGATION SYSTEM

(71) Applicant: International Business Machines Corporation, Armonk, NY (US)

(72) Inventors: Julia S. Baldauf, Victoria (AU); Fatemeh Jalali, Hawthorn East (AU); Benjamin Scott Mashford, Malvern East (AU); Mahsa Salehi, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 15/444,822

(22) Filed: Feb. 28, 2017

(65) Prior Publication Data
US 2018/0245941 A1 Aug. 30, 2018

(51) Int. Cl.
*G01C 21/36* (2006.01)
*G01C 21/34* (2006.01)
*G01S 19/13* (2010.01)
*G06K 9/00* (2006.01)

(52) U.S. Cl.
CPC ..... *G01C 21/3644* (2013.01); *G01C 21/3629* (2013.01); *G01S 19/13* (2013.01); *G06K 9/00791* (2013.01)

(58) Field of Classification Search
CPC ............ G01C 21/3644; G01C 21/3629; G01C 21/3605; G01C 21/3484; G01S 19/13
See application file for complete search history.

(56) References Cited

U.S. PATENT DOCUMENTS

| 5,181,250 | A | 1/1993 | Morgan et al. |
| 6,351,711 | B1 | 2/2002 | Chansarkar |
| 9,146,129 | B1* | 9/2015 | Furio ................. G01C 21/3682 |
| 9,978,013 | B2* | 5/2018 | Kaufhold ............ G06N 3/0454 |
| 2003/0202683 | A1 | 10/2003 | Ma et al. |
| 2010/0176987 | A1 | 7/2010 | Hoshizaki |
| 2011/0313653 | A1 | 12/2011 | Lindner |
| 2014/0365215 | A1* | 12/2014 | Kim ........................ G10L 15/22 704/235 |
| 2016/0054137 | A1 | 2/2016 | Wheatman et al. |
| 2017/0101056 | A1* | 4/2017 | Park ....................... B60Q 9/008 |
| 2018/0135986 | A1* | 5/2018 | Dayal ..................... G06F 17/30 |

OTHER PUBLICATIONS

Souza, Jefferson R., et al., "Vision-based Autonomous Navigation Using Neural Networks and Templates in Urban Environments", https://www.researchgate.net/publication/228399154, Feb. 22, 2017, 7 pgs.

(Continued)

*Primary Examiner* — Hunter B Lonsberry
*Assistant Examiner* — Mathew Franklin Gordon
(74) *Attorney, Agent, or Firm* — Harrington & Smith

(57) ABSTRACT

A computer-implemented method includes receiving an input, from a user, in the form of a destination to be navigated to; calculating a route to the destination based on the input; recognizing at least one object on a route taken by the user; processing data from the received input, the calculated route, and the recognized at least one object; and providing an output to the user based on the recognized at least one object, the output being based on natural language processing.

15 Claims, 9 Drawing Sheets

(56) References Cited

OTHER PUBLICATIONS

Zhang, Boping, "The Study of Visual Measurement Based on GPS Navigation", International Journal of Multimedia and Ubiquitous Engineering, vol. 11, No. 4, 2016, pp. 391-396.

"Prevenative Safety Innovations—Things That Help You Avoid an Accident", https://www.subaru.comau/why/safety; Feb. 28, 2017, 14 pages.

"Directed Directed", http://www.directed.com.au/products/; Feb. 28, 2017, 4 pages.

"How to Use iPhone for Turn-By-Turn Voice Navigation Directions with Siri", http://osxdaily.com/2014/01/19/iphone-turn-by-turn-voicenavigation-siri/; Feb. 28, 2017, 10 pages.

\* cited by examiner

USER-FRIENDLY NAVIGATION SYSTEM

TECHNICAL FIELD

The exemplary embodiments of this invention relate generally to navigation systems and, more specifically, to a navigation system that provides user-friendly instructions to a user of the navigation system.

BACKGROUND

Navigation systems based on signals from global positioning satellite (GPS) systems are generally able to provide locations and estimated directions of vehicles with amounts of error that are within established limits. Such navigation systems may require databases of map information (sometimes through a third party application installed on a user device) that pertains to characteristics of road segments and/or known landmarks catalogued in the databases. These navigation systems may assist in allowing a driver or pilot of a vehicle to keep a vehicle on designated courses, but they are generally lacking in the ability to provide user-friendly instructions that can be followed in complex situations.

For example, it may be difficult for a pilot of a vehicle to follow directions given by a navigation device because there is generally not enough time to look in detail at a screen of the navigation device, or the distance to a turn given by the device is not accurate or hard to discern from the audio command or the provided image. However, if a pilot is provided with instructions that are more human-like, such as "make a right turn after passing the big yellow sculpture after the construction site" or "follow the green car," the pilot will generally find it much easier to follow the instructions.

BRIEF SUMMARY

In accordance with one aspect of an exemplary embodiment, a computer-implemented method comprises: receiving an input, from a user, in the form of a destination to be navigated to; calculating a route to the destination based on the input; recognizing at least one object on a route taken by the user; processing data from the received input, the calculated route, and the recognized at least one object; and providing an output to the user based on the recognized at least one object, the output being based on natural language processing.

In accordance with another aspect of an exemplary embodiment, an apparatus comprises: a processor; and at least one non-transitory memory including computer program code, the at least-one memory and the computer program code configured to, with the at least one processor, cause the apparatus at least to: calculate a route to a destination to be navigated to based on an input from a user; recognize at least one object on a route taken by the user to the destination; process data from the input from the user, the calculated route, and the recognized at least one object; and provide an output to the user based on the recognized at least one object, the output being based on natural language processing.

In accordance with another aspect of an exemplary embodiment, in a computer program product for providing navigation instructions, the computer program product comprises a computer readable storage medium having program instructions embodied therewith, the program instructions being executable by a processor to cause the processor to: calculate a route to a destination based on a user-defined input; recognize at least one object on a route taken by a user; process data from the user-defined input, the calculated route, and the recognized at least one object; and provide an output to the user based on the recognized at least one object, the output being based on natural language processing.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The following acronyms may be used herein:
CPU central processing unit
GPS global positioning satellite
GPU graphical processing unit
LIDAR laser illumination detection and ranging
NLP natural language processing
RGB red-green-blue
wifi wireless fidelity
4G fourth generation The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Referring to the Figures, an improved GPS-based navigation system that provides more human-like and user-friendly instructions to a pilot of a vehicle is shown. Instructions that are human-like and user-friendly may be provided to the pilot (e.g., the driver of a car) using neural networks for object recognition and for text-to-speech algorithms. The navigation system may incorporate descriptions of objects that can be seen through cameras or obtained from existing databases.

Figure 1:
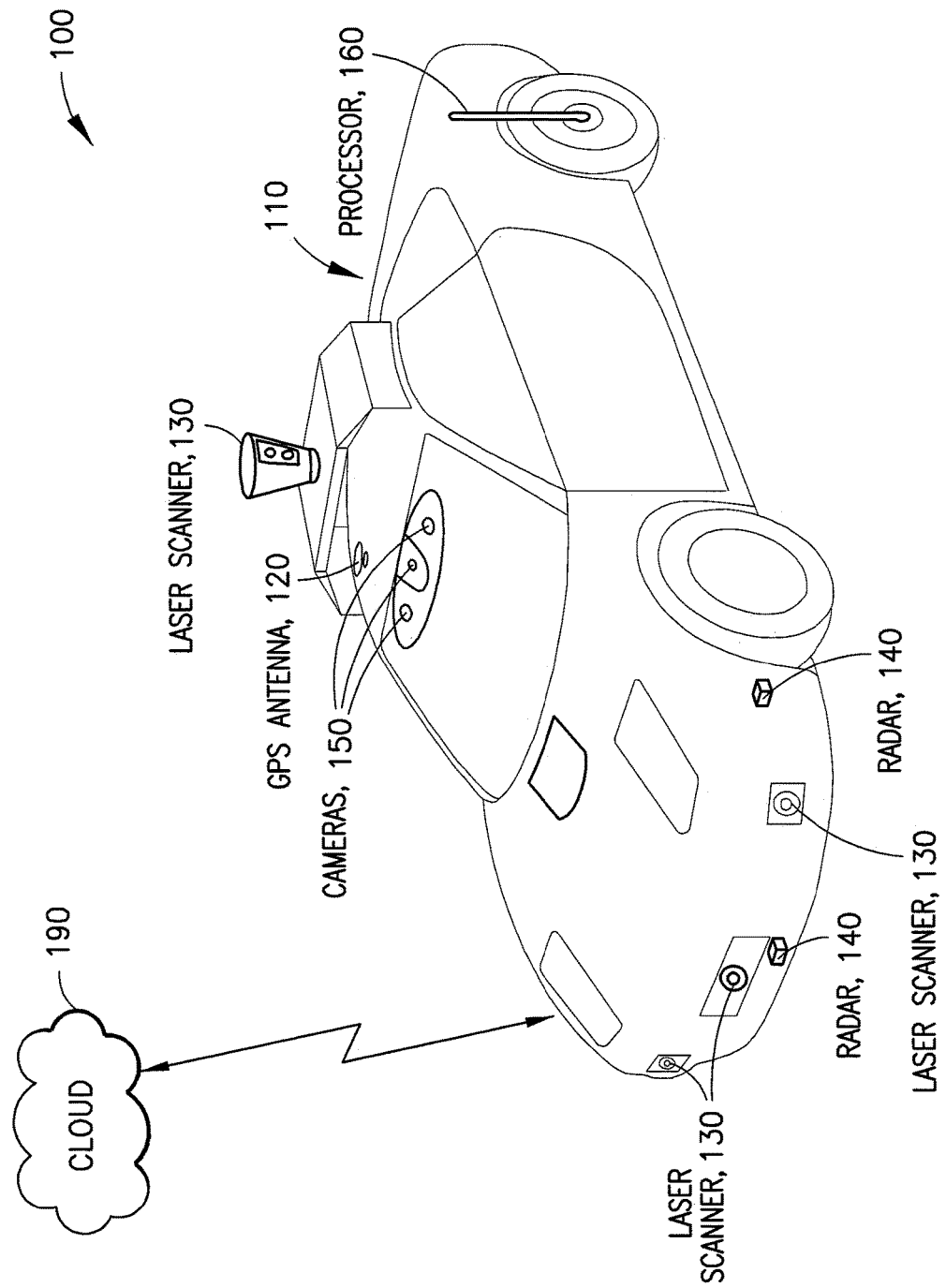
FIG. 1 is a schematic representation of a vehicle in which one embodiment of a navigation system as described herein may be incorporated.

As shown in FIG. 1, in one example, the GPS-based navigation system may be mounted on any suitable vehicle, such as a car, a truck, or a two- or any multi-wheeled vehicle, or a boat, and may include various hardware components. For example, the GPS-based navigation system (hereinafter referred to as "navigation system" and designated generally by the reference number 100), may be incorporated into a car 110. Various hardware components of the navigation system 100 include, but are not limited to, on-board sensors such as GPS receivers 120 (hereinafter "GPS 120") and associated antennas, distance sensors and shape detectors (e.g., lasers 130, LIDAR units, radar units 140, and the like) including cameras 150 (e.g., stereo pairs of cameras, RGB cameras, NIR cameras, and the like), on-board processors 160 (e.g., CPU/GPU) for deep neural network analysis on streaming input data, additional processors (e.g., CPU/GPU) for running NLP models to generate spoken instructions, and on-board wireless communication systems (e.g., 4G, wifi, and the like) that may connect to a cloud-based system 190 for downloading updated classification models and sharing local data (such as user-learned preferences).

Figure 2A:
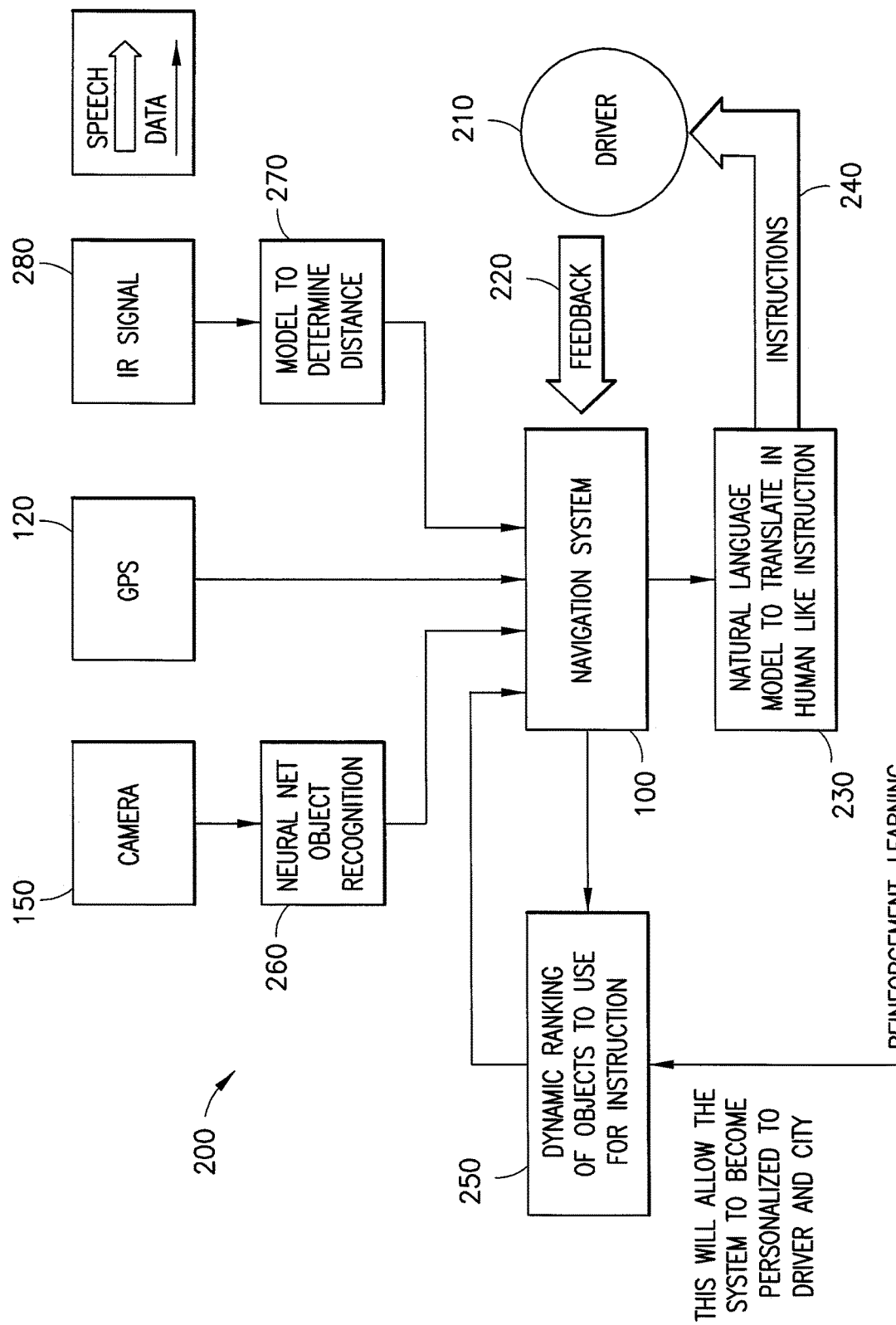
FIG. 2A is a graphical representation of one embodiment of the navigation system as described herein.

Referring to FIG. 2A, one example of a network for implementing the navigation system 100 is designated generally by the reference number 200 and is hereinafter referred to as "network 200." In the network 200, the pilot or driver 210 may provide input 220 to the navigation system 100. Such input 220 may comprise, for example, a desired destination as well as routing options (e.g., fastest, least tolls, least congestion, and the like). The navigation system 100 processes the input 220 and develops an NLP model 230 that provides instructions back to the driver 210. The NLP model 230 developed translates the processed input 220 and outputs the instructions as an NLP output 240 in the form of human-like user-friendly directions to the driver 210.

The navigation system 100 also processes the actions taken by the driver 210 (e.g., the corresponding results of the NLP output 240) and develops a ranking model 250. In the ranking model 250, objects are ranked for use in future NLP outputs 240 to the driver 210. For example, the type of a particular object may be determined from the cameras 150 and/or the distance sensors and/or shape detectors (such as the lasers 130). The dynamic ranking of sensed objects may allow the navigation system 100 to become personalized to the driver 210 and/or the location.

In processing the input 220 to develop the NLP model 230, the navigation system 100 utilizes one or more of object recognition 260, input from a model to determine distances 270, input from the GPS 120, and input from the ranking model 250.

Figure 2B:
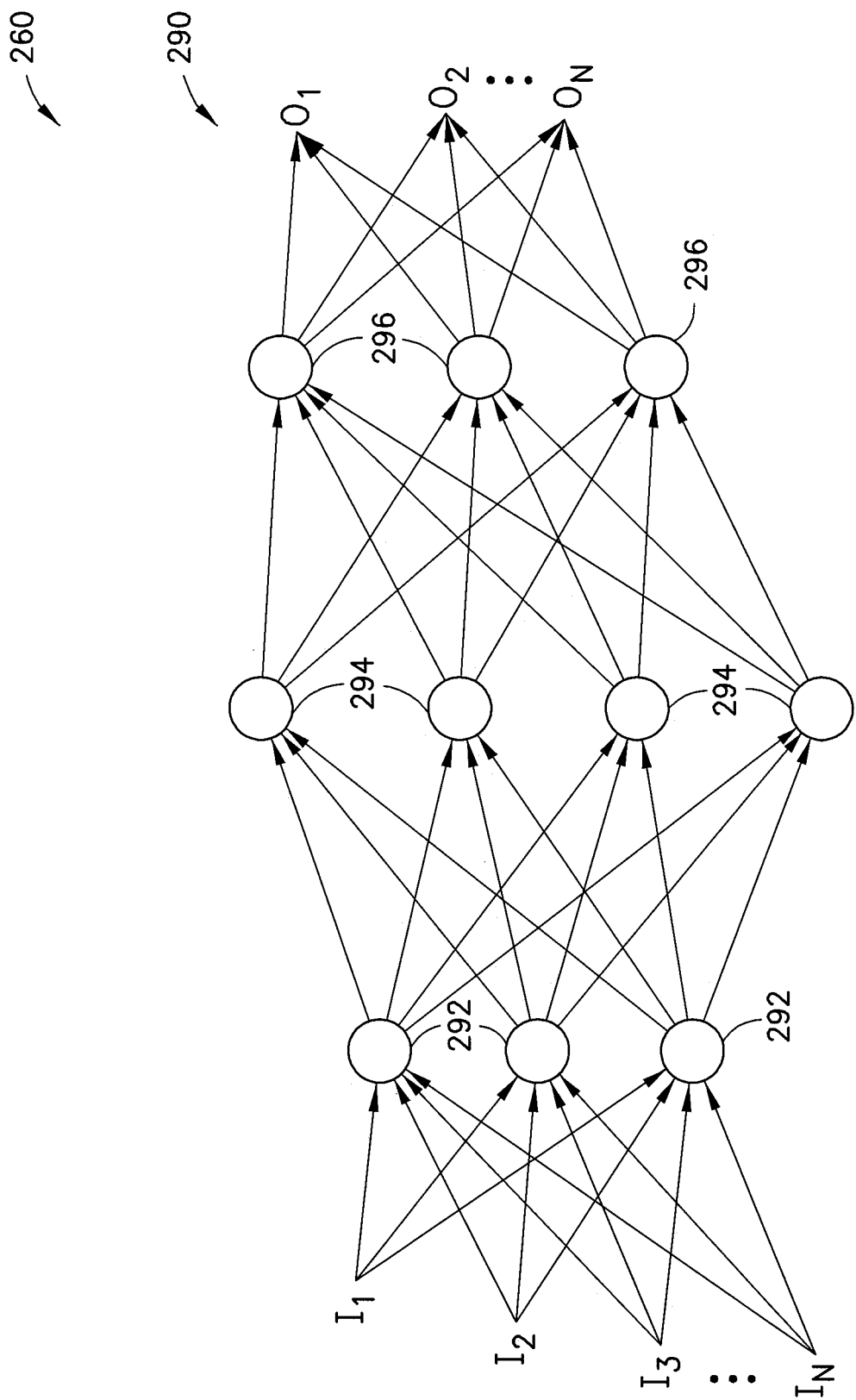
FIG. 2B is a graphical representation of one embodiment of a neural network of the navigation system as described herein.

Referring to FIG. 2B, the object recognition 260 may comprise a neural network 290 having neurons 292, 294, 296 that receive inputs into neurons 292 and operate together with the other neurons to mimic thought processes of the human brain. The neurons 292, 294, 296 process data to facilitate the recognition of objects based on shape, for example. Processing of the data may be based on comparative functions. The processed data is output as outputs $O_1 \ldots O_N$. Examples of neural networks that may be used include, but are not limited to, those based on convolutional networks with multiple hidden layers, fully-connected networks with multiple hidden layers, radial basis function, self-organizing maps, learning vector quantization, recurrent radial networks (Hopfield networks, Boltzmann machines, etc.), and the like. The processed data from the neural network 290 may be used in image analytic algorithms to recognize the type and location of objects in real-time from one or more of the cameras 150 and may incorporate the names of the recognized objects into a natural language description. Image analytic algorithms may include, but are not limited to, color hue detection algorithms, contour approximation algorithms, algorithms that detect parallax from multiple images to calculate distances, or algorithms that fuse visible or infrared spectral channels with scene depth data. Identification of objects within the scene may be achieved via image segmentation algorithms that perform semantic labelling by processing output from a neural network, support vector machine, random forest, or other machine learning classifier software.

In one exemplary embodiment, the image analytics used to recognize objects may comprise an on-board image classifier that provides a substantially immediate response to a streaming input (e.g., inputs $I_1 \ldots I_N$) from the one or more cameras 150. The on-board image classifier may compare the streamed inputs as graphical inputs from the one or more cameras 150 to stored images in a database. The navigation system 100 may periodically connect to a cloud server (e.g., cloud 190) to update the database of recognizable objects.

Referring to both FIGS. 2A and 2B, the input to determine distances 270 may also be a streaming input from, for example, the distance sensors and shape detectors (the lasers 130, LIDAR units, or stereo camera pairs). The distance sensors and shape detectors may, for example, emit a signal 280 such as an IR signal that can be input to the model to determine distances 270 and used to determine depth or physical distance. Parameters of the emitted signal 280 may be used with an algorithm to determine how far away objects are. This allows for the NLP outputs 240 as the human-like user-friendly directions to the driver 210 (e.g., "turn right at the red 4-wheel drive vehicle 250 feet ahead").

The input from the GPS 120 may comprise location information, such as one or more of street address and latitude/longitude coordinates.

In addition, the input from the ranking model 250 can be used by the system to learn in order to improve the directions output to the driver 210. Such learning may occur over time. By comparing a navigation path proposed by the navigation system 100 to an actual path taken by the driver 210, a "quality" component of a given NLP output 240 can be evaluated, and a score associated with the evaluated output instruction can be used to update the ranking model 250 (provide "reinforcement" learning). This allows the navigation system 100 to adapt to an individual driver's preferences and also to adapt to local conditions, such as the specifics of the environment.

Figure 3A:
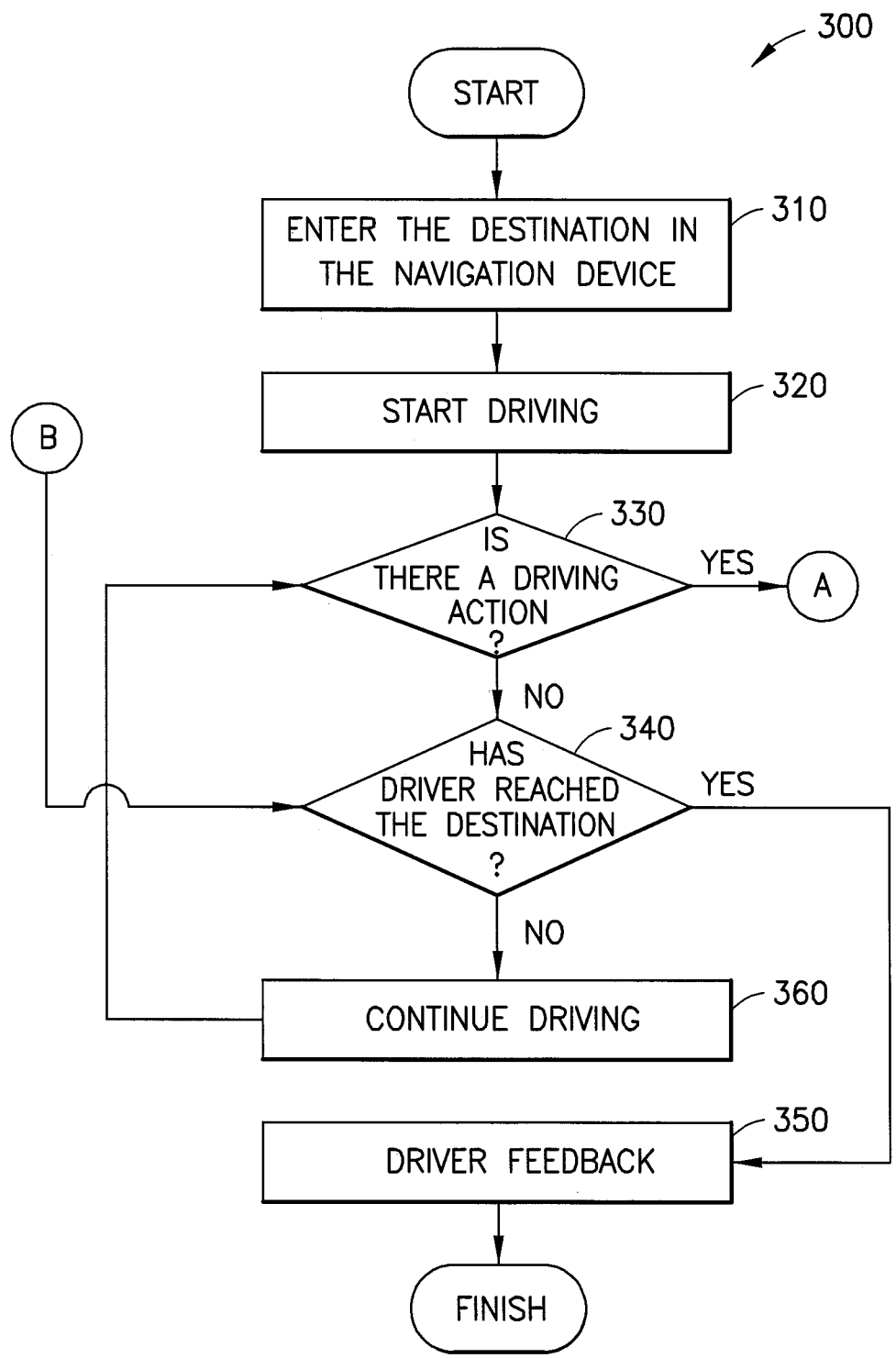
FIG. 3A is a flow of one embodiment of an initialization of a driving process employing the navigation system as described herein.

Referring to FIG. 3A, a logic flow diagram illustrating an initialization of a driving process using the navigation system 100 is designated generally by the reference number 300 and is hereinafter referred to as "initialization 300." At block 310 of the initialization 300, a destination determined by the driver 210 may be entered into the navigation system 100. As indicated at block 320, the driver 210 may begin driving. The navigation system 100 may be queried in query block 330 as to whether there is a current driving action. If there is no current driving action, the navigation system 100 may be queried in query block 340 as to whether a destination has been reached. An input to query block 340 may be received as an NLP output (from FIG. 4). If the destination has been reached, feedback 350 may be provided to the driver 210, and the driving process 300 may be terminated. If a destination has not been reached, driving may be continued, as indicated at block 360, and control may be passed back to the query block 330 to inquire as to whether there is a current driving action.

Figure 3B:
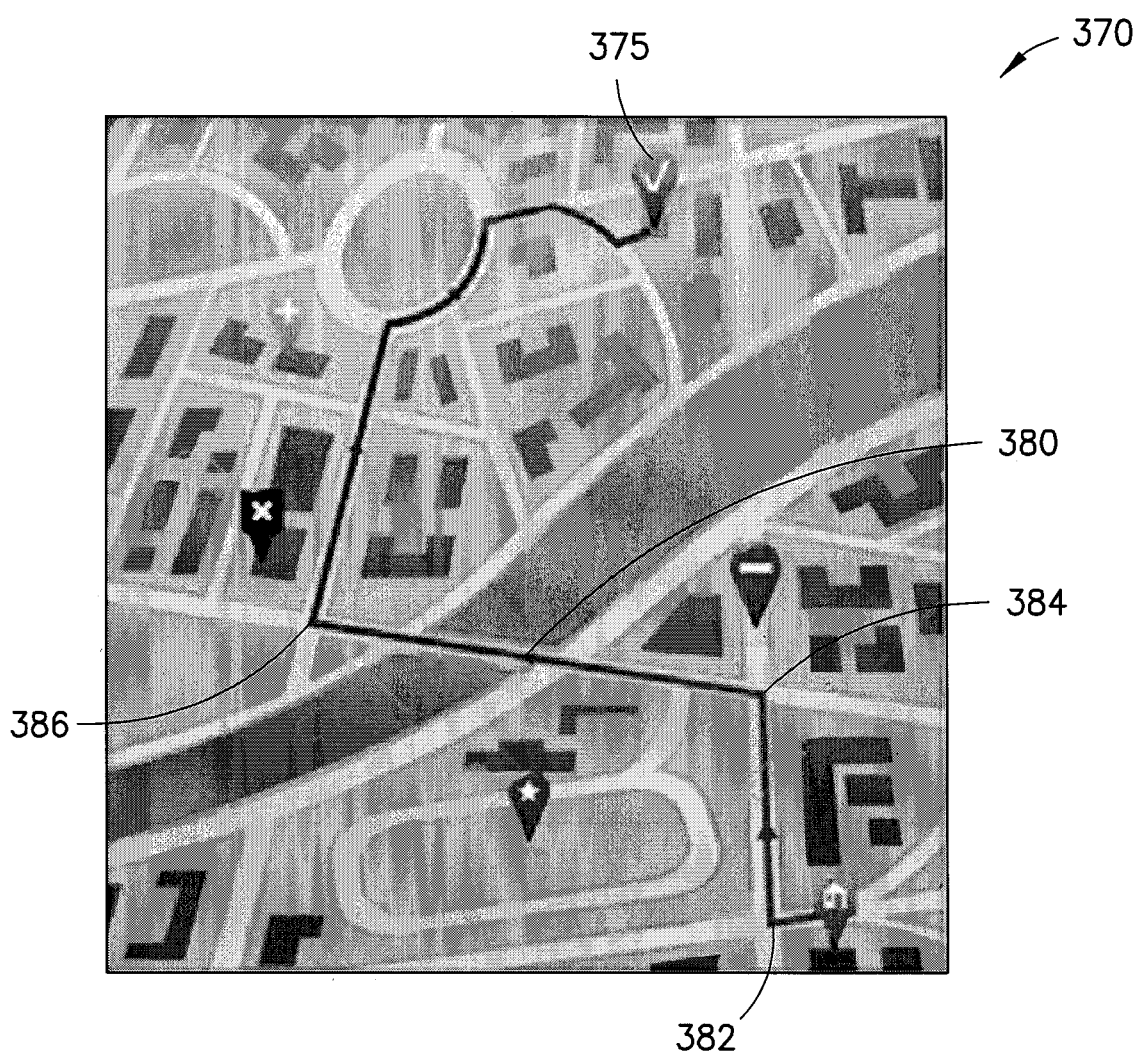
FIG. 3B is a graphical representation of one embodiment of a clarification of driving actions.

Referring to FIG. 3B, if there is a current driving action in response to query 330 (from FIG. 3A), then there may be a clarification 370 of driving actions. This clarification 370 may be displayed on a display device. In the clarification 370, after designating a destination 375, a route 380 may be pre-planned as a sequence of driving actions. For example, after the driver 210 begins driving, a first driver action 382 may indicate that the driver 210 should turn right and continue driving. A second driver action 384 may indicate that the driver 210 should turn left and continue driving. A third driver action 386 may, indicate that the driver 210 should turn right and continue driving. Subsequent driver actions may indicate further turns until the destination 375 is reached. An optimal audio instruction given by the navigation system 100 for each driver action may be determined dynamically (in real-time) from an output of the navigation system 100.

Figure 4:
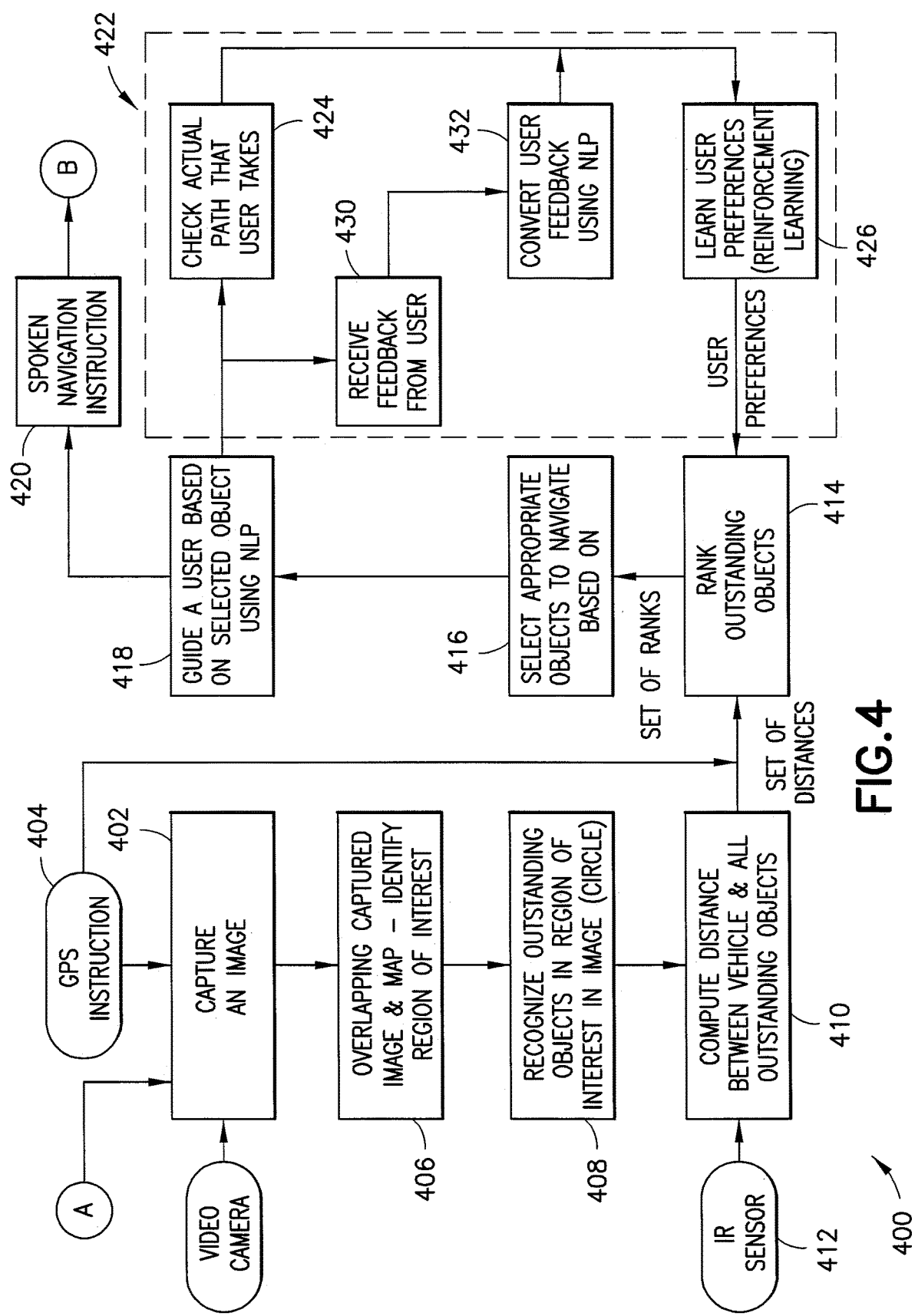
FIG. 4 is a flow of one embodiment of an operation of the navigation system as described herein and a result of execution of computer program instructions embodied on a computer readable memory, in accordance with an exemplary embodiment of the navigation system described herein.
Figure 5:
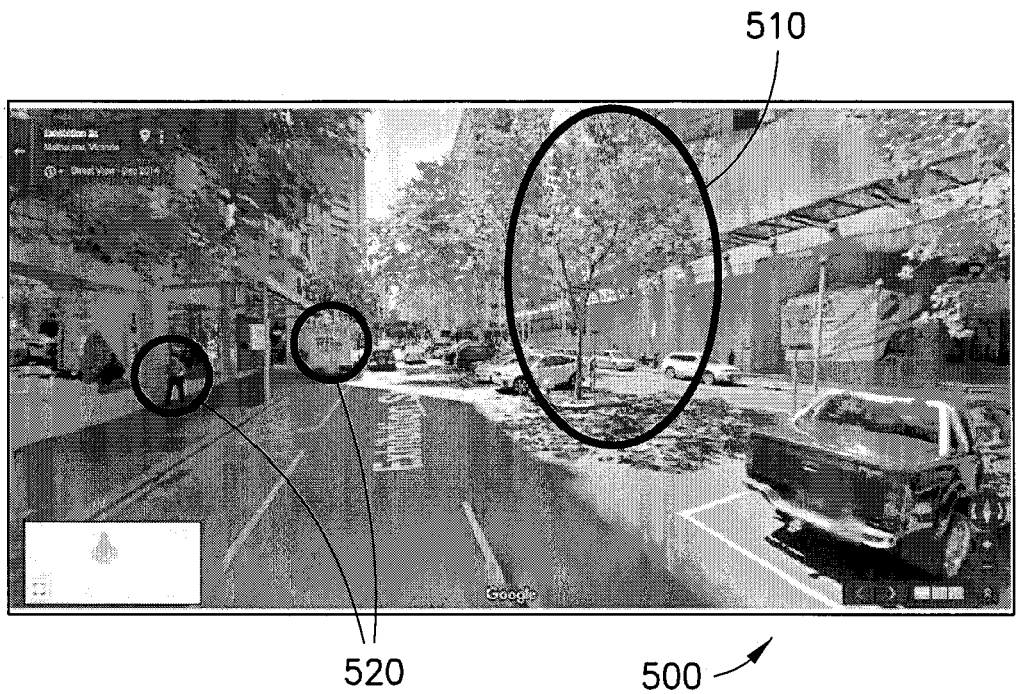
FIG. 5 is a schematic representation of a captured image of an object in a recognition step from the operation of the navigation system.
Figure 6:
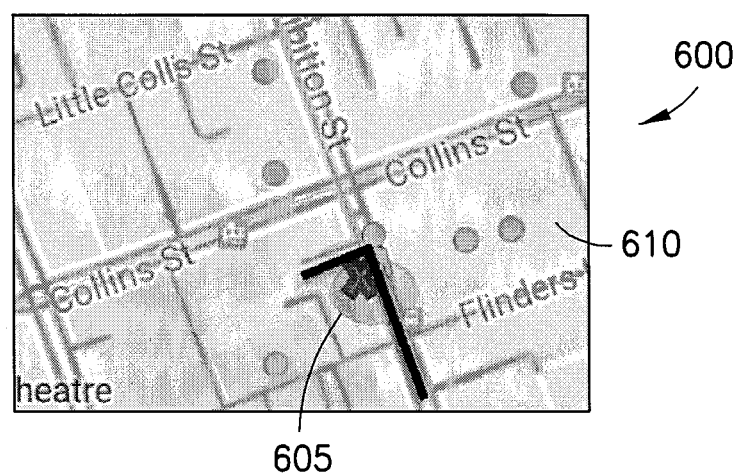
FIG. 6 is a graphical representation of the captured image of FIG. 5 correlated with a map.

Referring now to FIG. 4, a logic flow diagram illustrating one exemplary embodiment of an operation of the navigation system 100 is designated generally by the reference number 400 and is hereinafter referred to as "operation 400." In the operation 400, an input A in the form of an affirmation of a driving action from the query 330 from FIG. 3A may be used to capture 402 an instantaneous/real-time image/video as an input from one or more cameras 150 along with a GPS instruction 404 from the GPS 120. In the capture 402, an image 500 (e.g., image/video 500) as shown in FIG. 5 may be received by the navigation system 100. After the capture 402 of the image/video 500, a correlation 406 between the image/video 500 and the driving action is carried out (live navigation instruction), and an identification 600 and marking may be made of a region of interest 605 (on a map 610) as shown in FIG. 6. As shown in FIG. 6, the captured image/video 500 may be correlated with the GPS instruction 404, and the region of interest 605 may be designated (as indicated by the "x" on the map 610). The map 610 and any marking may be virtual. The identification 600 may be made by overlapping the captured image/video 500 and map 610 to determine the region of interest.

Referring back to FIGS. 4 and 5, after the identification 600, one or more objects may be recognized in a recognition step 408 (FIG. 4). In the recognition step 408, a region of interest 510 may be noted (encircled area in FIG. 5).

Figure 7:
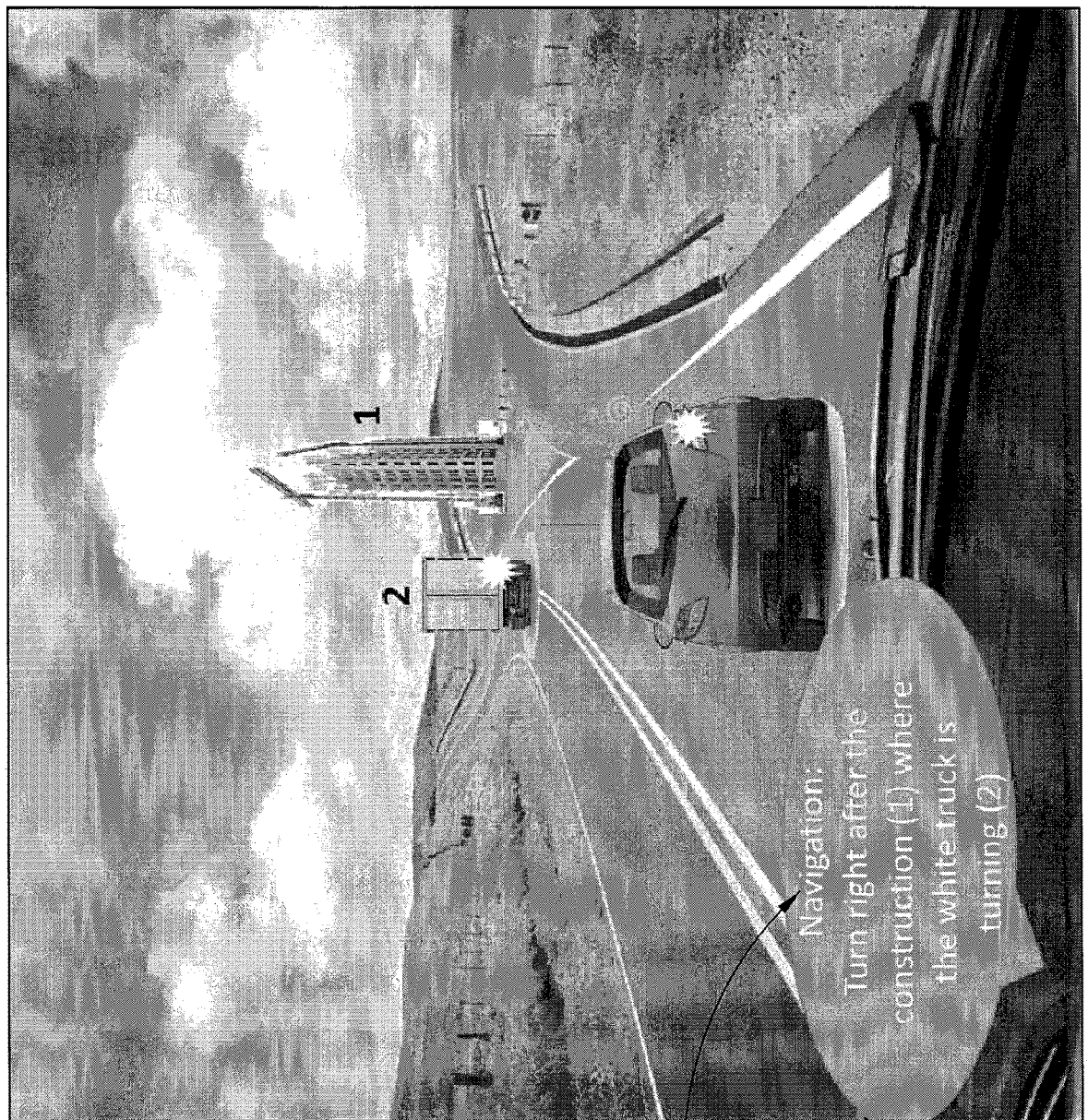
FIG. 7 is a schematic representation of an NLP output to a driver employing the navigation system as described herein.

Referring back to FIG. 4, data from the GPS 120 and the cameras 150 may be processed in a computation 410. The computation 410 is carried out in which distances between the vehicle in which the navigation system 100 operates and one or more objects 520 recognized in the recognition step 408 and the region of interest 510 may be determined. The computation 410 may incorporate data from any IR sensors 412 associated with the navigation system 100. A result of the computation 410, along with data from the GPS instruction 404, may be inputted to a ranking step 414 in which the one or more objects recognized are ranked (e.g., according to proximity of the one or more objects and any driver preferences). Based on the ranking step 414, a selection 416 may be made to determine an appropriate recognized object (e.g., an object with the highest ranking) to navigate from. This may be the object that the navigation system 100 instructs the driver 210 to follow. Control may then be passed to a guiding step 418, in which the driver 210 may be guided based on the selection 416 using a spoken navigation instruction as NLP output 420. One example of an NLP output 420 may be a user-friendly and easily understandable instruction based on content that may be readily recognized and discerned by the driver 210, such as "Turn, left after the yellow car." Such an example of an NLP output 420 may be one alternative to a less user-friendly instruction such as "Turn left in twenty meters," because a yellow car may be more easily recognized than a distance of twenty meters. As shown in FIG. 7, another example of an NLP output 420 may be "Turn right after the construction site where the white truck is."

Still referring to FIG. 4, the operation 400 may further include a feedback loop 422 in which feedback may be returned to the ranking step 414. In one stream of the feedback loop 422, the actual path taken by the driver 210 may be checked in a checking step 424, and data from the checking step 424 may be fed to a learning step 426 in which driver preferences are learned by the navigation system 100. This learning step 426 may be considered "reinforcement learning." The results of the learning step 426 may be used in the ranking step 414. In another (optional) stream of the feedback loop 422, feedback 430 may be received from the driver 210, and such feedback 430 may be converted into instructions using NLP in a converting step 432. The results of the converting step 432 may be used in the learning step 426 and subsequently fed to the ranking step 414.

If there is no current driving action in response to query 330 (from FIG. 3A), then no image recognition is obtained, and the driver 210 continues to drive.

In any embodiment, the driver 210 may continue to drive until the destination 375 is reached.

The various blocks shown in FIGS. 2A, 3A, and 4 may be viewed as method steps, and/or as operations that result from operation of computer program code, and/or as a plurality of coupled logic circuit elements constructed to carry out the associated function(s).

Figure 8:
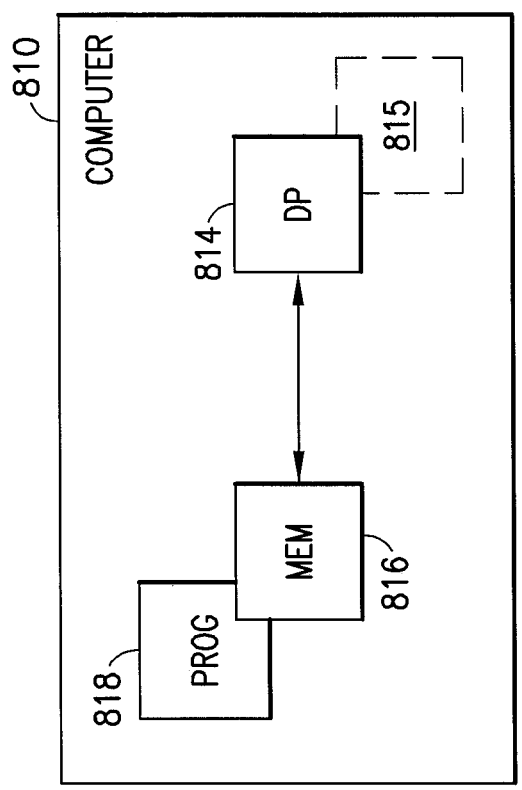
FIG. 8 is a block diagram of various electronic devices and apparatuses that may be suitable for carrying out the processes described herein.

Referring now to FIG. 8, a simplified block diagram of various electronic devices and apparatuses that are suitable for use in practicing the exemplary embodiments described herein is shown. For example, a computer 810 may be used to control one or more of the processes as described above. The computer 810 may include a controller, such as a computer or a data processor (DP) 814 and a computer-readable memory medium embodied as a memory (MEM) 816 that stores a program of computer instructions (PROG) 818.

The PROG 818 may include program instructions that, when executed by the associated DP 814, enable the various electronic devices and apparatuses to operate in accordance with exemplary embodiments. That is, various exemplary embodiments may be implemented at least in part by computer software executable by the DP 814 of the computer 810, or by hardware, or by a combination of software and hardware (and firmware).

The computer 810 may also include dedicated processors, for example a processor 815 that controls the operations of the hardware (e.g., the on-board sensors such as the GPS receivers 120, the distance sensors and shape detectors (e.g., lasers 130, LIDAR units, radar units 140, and the like), the cameras 150 (e.g., stereo pairs of cameras, RGB cameras, NIR cameras, and the like), as well as the on-board processors for neural network analysis and for running the NLP models to generate spoken instructions.

The computer readable MEM 816 may be of any type suitable to the local technical environment and may be implemented using any suitable data storage technology, such as semiconductor based memory devices, flash memory, magnetic memory devices and systems, optical memory devices and systems, fixed memory, and removable memory. The DP 814 may be of any type suitable to the local technical environment, and may include one or more of general purpose computers, special purpose computers, microprocessors, digital signal processors (DSPs), and processors based on a multicore processor architecture, as non-limiting examples.

The exemplary embodiments, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise utilizing the exemplary embodiments of the method.

In any embodiment, the NLP output 240 may be a result of an execution of computer program instructions (such as PROG 818)), in accordance with the exemplary embodiments.

Based on the foregoing, it should be apparent that various exemplary embodiments provide methods to allow a driver to navigate based on real-time user-friendly instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently; or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In accordance with one aspect of an exemplary embodiment, a computer-implemented method comprises: receiving an input, from a user, in the form of a destination to be navigated to; calculating a route to the destination based on the input; recognizing at least one object on a route taken by the user; processing data from the received input, the calculated route, and the recognized at least one object; and providing an output to the user based on the recognized at least one object, the output being based on natural language processing.

In the computer-implemented method, recognizing at least one object may comprise processing data through a neural network. Processing data through a neural network may comprise using image analytic algorithms. Recognizing at least one object may comprise comparing a graphical input to elements in a database of recognizable objects. The elements in the database may be updated by connecting to a cloud server. Processing data from the received input may comprise determining distance information from one or more of a camera, a system of multiple cameras, a laser, LIDAR, and radar. Processing data from the received input, the calculated route, and the recognized at least one object may comprise processing data from one or more of a global positioning satellite system, a distance sensor, and a shape detector. The method may further comprise ranking at least two of the at least one recognized objects. The method may further comprise using the processed data from the received input, the calculated route, and the recognized at least one object to cause learning of a user preference. Providing an output to the user may comprise providing a user-friendly instruction in natural language.

In accordance with another aspect of an exemplary embodiment, an apparatus comprises: a processor; and at least one non-transitory memory including computer program code, the at least one memory and the computer program code configured to, with the at least one processor, cause the apparatus at least to: calculate a route to a destination to be navigated to based on an input from a user; recognize at least one object on a route taken by the user to the destination; process data from the input from the user, the calculated route, and the recognized at least one object; and provide an output to the user based on the recognized at least one object, the output being based on natural language processing.

A neural network may be used to recognize the at least one object. The neural network may comprise image analytic algorithms. The apparatus may further comprise a database of recognizable objects to which the recognized at least one object may be compared. The apparatus may further comprise one or more of at least one camera, a laser, LIDAR, and radar to provide at least one input for causing the apparatus to process data from the input to determine distance.

In accordance with another aspect of an exemplary embodiment, in a computer program product for providing navigation instructions, the computer program product comprises a computer readable storage medium having program instructions embodied therewith, the program instructions being executable by a processor to cause the processor to: calculate a route to a destination based on a user-defined input; recognize at least one object on a route taken by a user; process data from the user-defined input, the calculated route, and the recognized at least one object; and provide an output to the user based on the recognized at least one object, the output being based on natural language processing.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:
1. A computer-implemented method, comprising:
receiving an input, from a user, in the form of a destination to be navigated to;
calculating a route to the destination based on the input;
recognizing at least two objects on a route taken by the user;
processing data from the received input, the calculated route, and the recognized at least two objects;
providing an audio output to the user based on at least one of the recognized at least two objects, the output being a natural language description to the user that is based on natural language processing;
ranking the at least two objects based on the processed data;

processing an action taken by the user, the action being based at least in part on the ranked at least two objects;

re-ranking at least two of the at least two objects based on the processed action taken by the user; and using the re-ranked at least two objects in a future audio output to the user.

2. The computer-implemented method of claim 1, where recognizing at least two objects comprises processing data through a neural network.

3. The computer-implemented method of claim 2, where processing data through a neural network comprises using image analytic algorithms.

4. The computer-implemented method of claim 3, where recognizing at least two objects comprises comparing a graphical input to elements in a database of recognizable objects.

5. The computer-implemented method of claim 4, where the elements in the database are updated by connecting to a cloud server.

6. The computer-implemented method of claim 1, where processing data from the received input comprises determining distance information from one or more of a camera, a system of multiple cameras, a laser, LIDAR, and radar.

7. The computer-implemented method of claim 1, where processing data from the received input, the calculated route, and the recognized at least two objects comprises processing data from one or more of a global positioning satellite system, a distance sensor, and a shape detector.

8. The computer-implemented method of claim 1, further comprising using the processed data from the received input, the calculated route, and the recognized at least two objects to cause learning of a user preference.

9. The computer-implemented method of claim 1, where providing an output to the user comprises providing a user-friendly instruction in natural language.

10. An apparatus, comprising:
a processor; and
at least one non-transitory memory including computer program code, the at least one memory and the computer program code configured to, with the at least one processor, cause the apparatus at least to:
calculate a route to a destination to be navigated to based on an input from a user;
recognize at least two objects on a route taken by the user to the destination;
process data from the input from the user, the calculated route, and the recognized at least two objects;
provide an audio output to the user based on at least one of the recognized at least two objects, the output being a natural language description to the user that is based on natural language processing;
rank the at least two objects based on the processed data;
process an action taken by the user, the action being based at least in part on the ranked at least two objects;
re-rank at least two of the at least two objects based on the processed action taken by the user; and
use the re-ranked at least two objects in a future audio output to the user.

11. The apparatus of claim 10, where a neural network is used to recognize the at least two objects.

12. The apparatus of claim 11, where the neural network comprises image analytic algorithms.

13. The apparatus of claim 12, further comprising a database of recognizable objects to which the recognized at least two objects may be compared.

14. The apparatus of claim 10, further comprising one or more of at least one camera, a laser, LIDAR, and radar to provide at least one input for causing the apparatus to process data from the input to determine distance.

15. A computer program product for providing navigation instructions, the computer program product comprising a computer readable storage medium having program instructions embodied therewith, the program instructions being executable by a processor to cause the processor to:
calculate a route to a destination based on a user-defined input;
recognize at least two objects on a route taken by a user;
process data from the user-defined input, the calculated route, and the recognized at least two objects;
provide an audio output to the user based on at least one of the recognized at least two objects, the output being a natural language description to the user that is based on natural language processing;
rank the at least two objects based on the processed data;
process an action taken by the user, the action being based at least in part on the ranked at least two objects;
re-rank at least two of the at least two objects based on the processed action taken by the user; and
use the ranked at least two objects in a future audio output to the user.

\* \* \* \* \*